US012072034B2

(12) United States Patent
Neeb et al.

(10) Patent No.: US 12,072,034 B2
(45) Date of Patent: Aug. 27, 2024

(54) ROTARY VALVE

(71) Applicant: Stormwell Inc., Guelph (CA)

(72) Inventors: Timothy Howard Neeb, Guelph (CA); Tristan Zimmermann, Guelph (CA)

(73) Assignee: Stormwell Inc., Guelph (CA)

( * ) Notice: Subject to any disclaimer, the term of this patent is extended or adjusted under 35 U.S.C. 154(b) by 0 days.

(21) Appl. No.: 17/781,104

(22) PCT Filed: Dec. 4, 2020

(86) PCT No.: PCT/CA2020/051664
§ 371 (c)(1),
(2) Date: May 31, 2022

(87) PCT Pub. No.: WO2021/108915
PCT Pub. Date: Jun. 10, 2021

(65) Prior Publication Data
US 2022/0403944 A1 Dec. 22, 2022

Related U.S. Application Data

(60) Provisional application No. 62/943,425, filed on Dec. 4, 2019.

(51) Int. Cl.
*F16K 21/18* (2006.01)
*F16K 1/22* (2006.01)
(Continued)

(52) U.S. Cl.
CPC ............. *F16K 21/18* (2013.01); *F16K 1/221* (2013.01); *F16K 1/222* (2013.01); *F16K 1/2261* (2013.01); *F16K 31/22* (2013.01)

(58) Field of Classification Search
CPC ...... F16K 1/165; F16K 1/2007; F16K 1/2014; F16K 1/2021; F16K 1/205; F16K 1/221;
(Continued)

(56) References Cited

U.S. PATENT DOCUMENTS

| 1,150,342 A | 8/1915 | Cogswell |
| 3,601,146 A | 8/1971 | Reighard et al. |

(Continued)

FOREIGN PATENT DOCUMENTS

| CN | 113187906 A | * | 7/2021 | ........... F16K 1/2021 |
| DE | 1264190 B | | 3/1968 | |

(Continued)

OTHER PUBLICATIONS

International Search Report for International Application PCT/CA2020/051664 dated Feb. 16, 2021.

(Continued)

*Primary Examiner* — Hailey K. Do
(74) *Attorney, Agent, or Firm* — Gowling WLG (Canada) LLP

(57) ABSTRACT

A rotary valve and float assembly for controlling a flow of liquid into a container including a plug valve portion and a divider portion. The plug valve portion including a set of plugs that seal against a set of openings in the divider portion when the rotary valve is in a closed position. Movement of the rotary valve between open and closed positions is controlled by the movement of the float assembly in the container. The float assembly typically moves according to a liquid level within the container.

18 Claims, 13 Drawing Sheets

(51) Int. Cl.
*F16K 1/226* (2006.01)
*F16K 31/22* (2006.01)

(58) Field of Classification Search
CPC ........ F16K 1/222; F16K 1/2261; F16K 31/18;
F16K 31/20; F16K 31/22; F16K 21/18;
F16K 11/052; F16K 11/0525; F16K
24/048; G05D 9/02; Y10T 137/7365;
Y10T 137/7485; Y10T 137/7481; B65D
90/26

See application file for complete search history.

(56) References Cited

U.S. PATENT DOCUMENTS

| | | | |
|---|---|---|---|
| 4,741,358 A | 5/1988 | Cho | |
| 4,743,365 A * | 5/1988 | Noland | B01D 35/04 |
| | | | 210/128 |
| 6,913,047 B1 | 7/2005 | Kane et al. | |
| 7,096,880 B2 * | 8/2006 | Aoki | F16T 1/24 |
| | | | 137/434 |
| 9,080,689 B2 | 7/2015 | Ariizumi | |
| 2010/0148107 A1 | 6/2010 | Keller-Staub | |
| 2017/0254429 A1 | 9/2017 | Hadd et al. | |
| 2022/0251820 A1 * | 8/2022 | Mantyla | F16K 31/28 |

FOREIGN PATENT DOCUMENTS

| | | | | |
|---|---|---|---|---|
| DE | 102018103283 A1 * | 8/2018 | ........... | F01D 17/105 |
| EP | 1927555 A1 | 6/2008 | | |
| EP | 2749761 B1 | 3/2017 | | |
| GB | 2019534 B | 9/1982 | | |
| GB | 2305712 A * | 4/1997 | ............... | E03F 7/04 |
| KR | 20010054965 A | 7/2001 | | |
| KR | 100839207 B1 * | 6/2008 | | |

OTHER PUBLICATIONS

The European Search Report for the corresponding EP Application No. 20895317.4 dated Nov. 2, 2023.

* cited by examiner

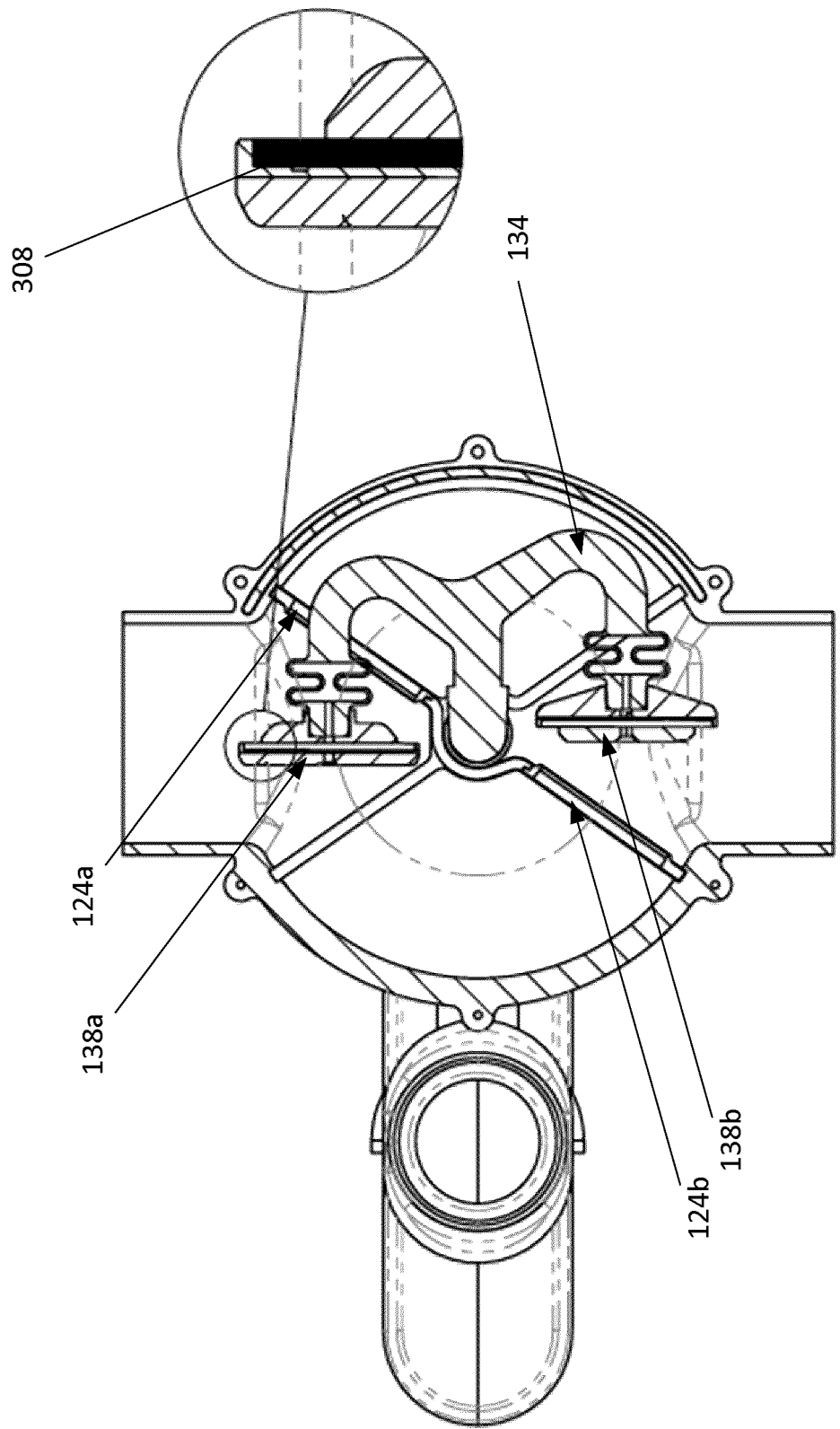

ROTARY VALVE

CROSS-REFERENCE TO OTHER APPLICATIONS

This disclosure claims priority from U.S. Provisional Application No. 62/943,425 filed Dec. 4, 2019, which is hereby incorporated by reference.

FIELD OF THE DISCLOSURE

The disclosure is generally directed at valves, and more specifically, at an automatic rotary shut off valve for liquids.

BACKGROUND OF THE DISCLOSURE

When liquid collection tanks, reservoirs, or other liquid storage containers reach their maximum capacity, the liquid input into the container needs to be automatically shut off to protect against over filling. This is particularly important when the liquid is dangerous or the storage container is located inside a building where the property damage due to water or liquid would be high. This is also important when the amount of liquid received is inconsistent or unpredictable, for example in a rainwater harvesting system. The amount of rainwater falling varies greatly and therefore there needs to be a reliable automatic shut off valve that will protect against rainwater from exceeding the maximum level of the rainwater storage tank and spilling out into a building if located inside or around the foundation of the building if located outside.

Therefore, there is provided a novel rotary valve.

SUMMARY OF THE DISCLOSURE

The disclosure is directed at a rotary shut off valve for liquids. The rotary valve is typically combined with a float assembly to provide an automatic shut off for liquid entering a container. Movement of the float assembly, such as by the level of liquid within the container, controls a plug valve within the rotary valve to move between open and closed positions. When in the open position, the rotary valve allows liquid to flow into the container and when in the close position, the rotary valve stops liquid from entering or flowing into the container.

In one aspect, there is provided a rotary valve for use in a liquid tank having a level of liquid including a body portion including: a plug valve portion including a set of plugs; a body portion divider including a set of openings for receiving the set of plugs; and a shaft portion wherein rotation of the shaft portion controls movement of the plug valve portion with respect to the body portion divider; and a float assembly portion, the float assembly portion including a float portion and a pair of float arms connected to, and extending from, the float portion at a first end and connected to the shaft portion of the body portion at a second end; wherein a change in the level of liquid causes movement of the pair of float arms to urge the shaft portion to rotate thereby causing the set of plugs to engage with the set of openings.

In another aspect, the body portion further includes a housing component for housing the plug valve portion, the body portion divider and the shaft portion. In a further aspect, the housing component includes a first body cavity wall portion and a second body cavity wall portion that, when connected with other, form a cavity. In yet a further aspect, the body portion divider is connected to an inside wall of each of the first and second body cavity wall portions. In another aspect, the body portion divider is connected to the inside wall of each of the first and second body cavity wall portions via slots. In an aspect, the shaft portion extends through openings in the first and second body cavity wall portions.

In a further aspect, the pair of float arms are connected to an end of the float. In yet another aspect, the float portion includes a pair of float end portions; and a middle float portion; wherein each of the pair of float end portions are connected to the middle float portion on opposite sides of the middle float portion. In yet a further aspect, each of the pair of float end portions are connected to the middle float portion via connection portions. In another aspect, the float arm portions are connected to the float portion at the connection portions.

In a further aspect, the disclosure further includes bracket portions for locking the float arm portions with respect to the float portion. In another aspect, the disclosure includes an inlet receiving a liquid from an external source. In yet another aspect, the disclosure includes an outlet for releasing liquid from the rotary valve into the tank. In a further aspect, the float portion rests atop the level of liquid of the tank. In an aspect, when the level of liquid rises, the float rises thereby causing the float arms to move. In a further aspect, the disclosure further includes float rests mounted to opposite sides of the body portion. In yet another aspect, the plug valve portion further includes at least one spring portion. In another aspect, each of the set of plugs includes a sealing portion. In an aspect, the sealing portion is made of a waterproof and flexible material.

In another aspect of the disclosure, there is provided a rotary valve including a body portion including a plug valve portion including a set of plugs; a body portion divider including a set of holes for receiving the set of plugs; and a shaft portion wherein rotation of the shaft portion controls movement of the plug valve portion with respect to the body portion divider.

In a further aspect, the disclosure further includes a shaft rotation mechanism for rotating the shaft portion when a predetermined condition is met thereby causing the set of plugs to engage with the set of holes.

BRIEF DESCRIPTION OF THE DRAWINGS

The foregoing and other features and advantages of the disclosure will be apparent from the following description of embodiments thereof as illustrated in the accompanying drawings. The accompanying drawings, which are incorporated herein and form a part of the specification, further serve to explain the principles of the disclosure and to enable a person skilled in the pertinent art to make and use the invention. The drawings are not to scale.

FIG. 8a is a side view of a further embodiment of a rotary valve with an enlarged view of a sealing portion in an open position;

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. Directional terms used within the specification are with respect to the way in which the figure is presented unless otherwise described. Furthermore, there is no intention to be bound by any expressed or implied theory presented in the preceding technical field, background, brief summary or the following detailed description.

Figure 1A:
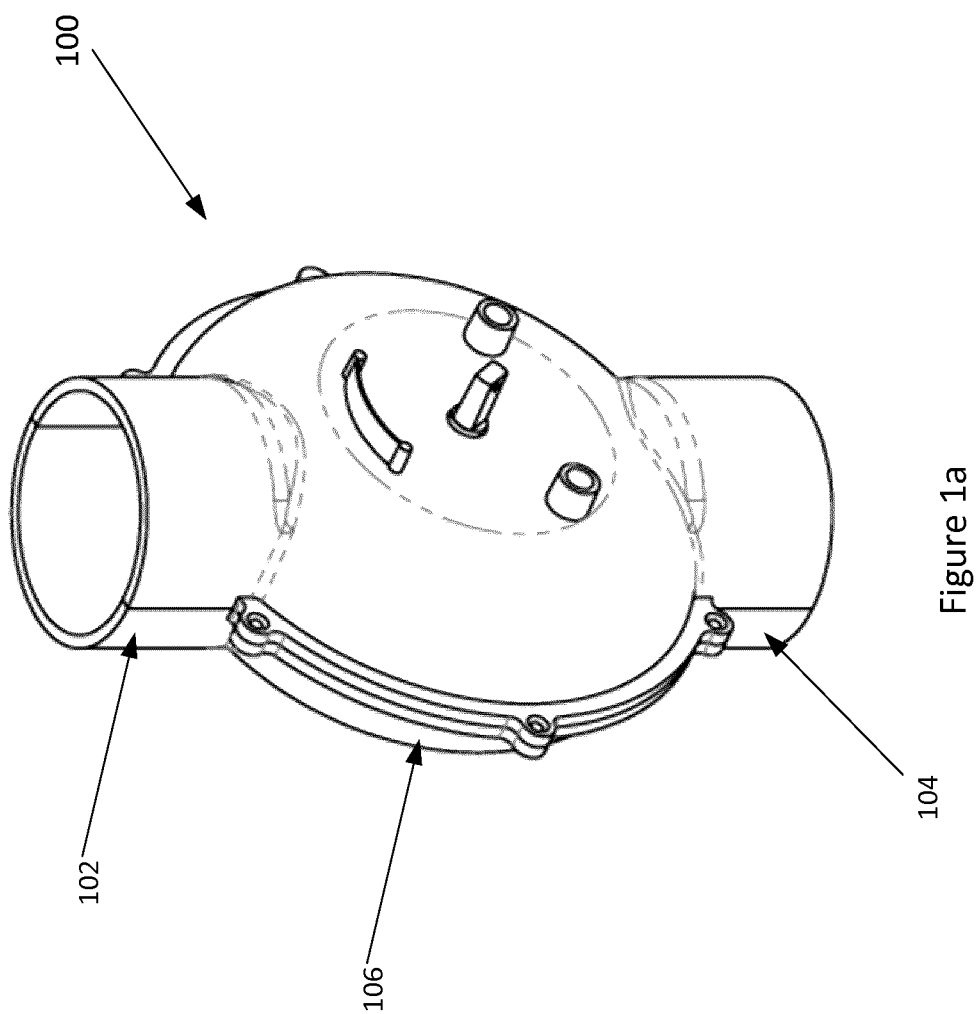
FIG. 1a is a perspective view of a rotary valve.
Figure 1B:
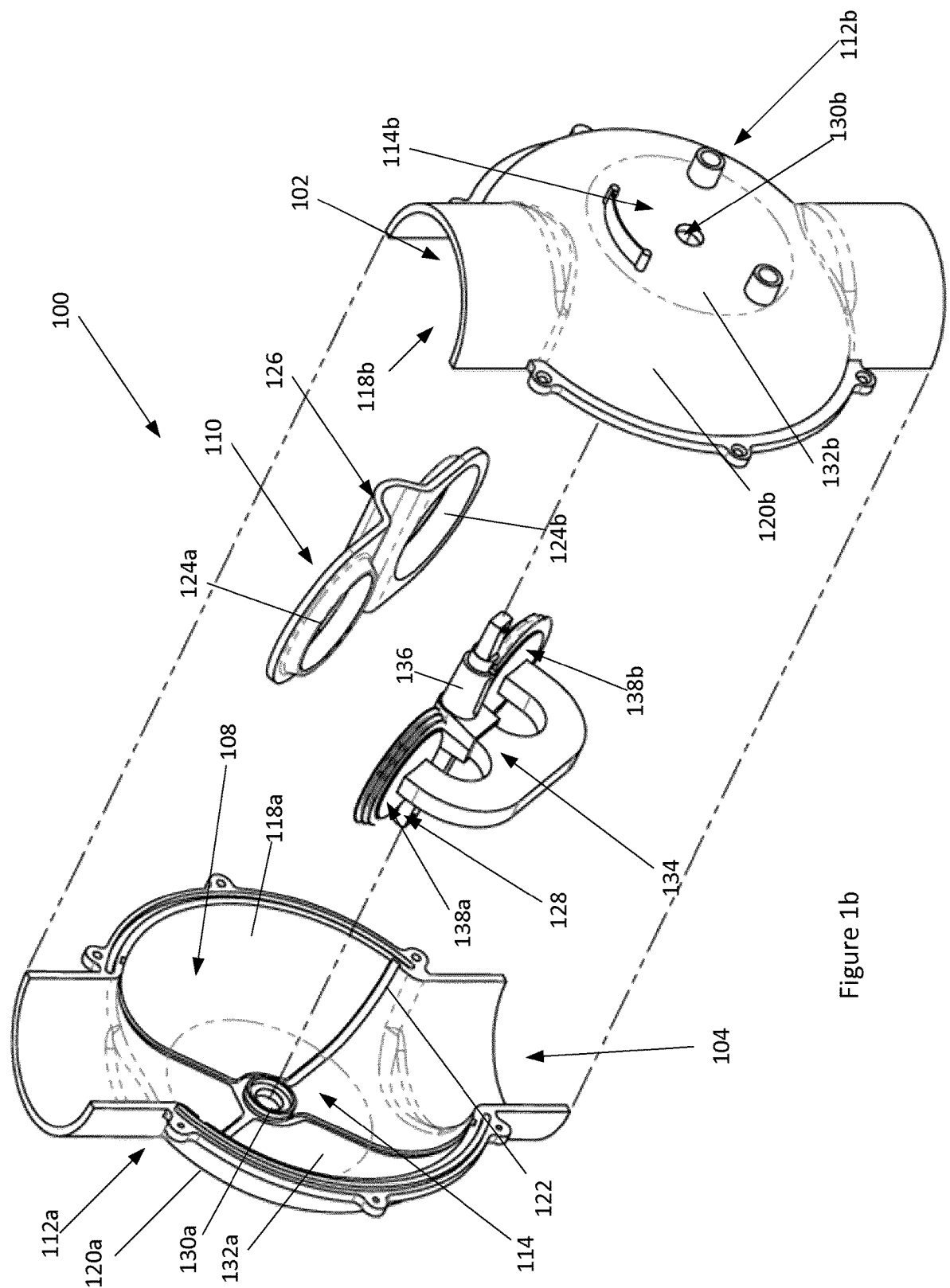
FIG. 1b is an exploded view of one embodiment of a rotary valve.

Turning to FIG. 1a, a perspective view of a rotary valve is shown. FIG. 1b provides an exploded view of the rotary valve. As shown in these Figures, the rotary valve 100 includes an inlet portion 102 and an outlet portion 104 at opposite ends of a body, or body portion. The body portion 106 forms a cavity 108 for receiving a liquid that enters from the inlet portion 102. A divider 110 located inside the body portion 106 divides the cavity 108 into two sides. In the current embodiment, the body portion 106 is formed of two similarly shaped body cavity wall portions 112a and 112b which may be seen as body halves, or body half portions, that are joined together. The body halves 112a and 112b may be connected together via fasteners, such as screws, bolts, rivets and the like, may be fastened via a snap fit, may be welded together or may be adhered together via known methods. In the current embodiment, each of the body halves 112a and 112b are bowl shaped with a, respective, convex inside surface 118a and 118b and a, respective, concave outside surface 120a and 120b. Body halves 112a and 112b further include divider receiving structures 122 located on the respective inside surface 118. In the current embodiment, the divider receiving structures 122 are slots formed on the inside surface 118 of each body half 112 and are sized and aligned to hold the divider 110 in place inside the cavity 108 when the two body halves 112a and 112b are joined, or connected, together.

In the current embodiment, as schematically shown in FIG. 1b, the divider 110 has a set of two openings 124a and 124b which allow the liquid to pass from one side of the cavity to the other side of the cavity. The divider 110 further includes a shaft accommodating portion 126 which, in the current embodiment, is an open channel that is sized and shaped to allow a shaft 128 to rotate a certain, or predetermined, amount when the rotary valve 100 is fully assembled. Opposite ends of the shaft 128 are mounted to, or inserted into, shaft receivers 130a and 130b when the rotary valve is fully assembled. In some embodiments, the shaft 128 simply rests within the shaft receivers 130 (seen as shaft receivers 130a and 130b).

The rotary valve 100 further includes a plug valve, which may be seen as a rocker arm, 134 that includes a shaft receiving, or engagement, portion 136 for receiving the shaft 128. The shaft engagement portion 136 is sized and shaped to be fixably attached to the shaft 128. In the current embodiment, the plug valve 134 is located at about a middle of a length of the shaft 128. As understood, the plug valve 134 and the shaft 128 are connected whereby they rotate together. Plug valve, or rocker arm, 134 includes two plug portions 138a and 138b that are spaced apart from each other and shaped to match divider openings 124a and 124b respectively, so that when the plugs 138a and 138b are engaged with the divider openings 124a and 124b, the plugs 138 seal the divider openings 124 to prevent liquid, or reduce the likelihood of liquid, flowing through the divider 110 from one side of the cavity to the other side of the cavity when the rotary valve 100 is in the closed position.

Although a two piece body construction has been shown in this embodiment, it may be possible to three-dimensionally (3D) print the body 106 and divider 110 as a unitary structure and then insert the plug valve 134 through the inlet portion 102 or outlet portion 104 and then attach the plug valve 134 to the rotary valve 100 with a two piece shaft 128.

Figure 2:
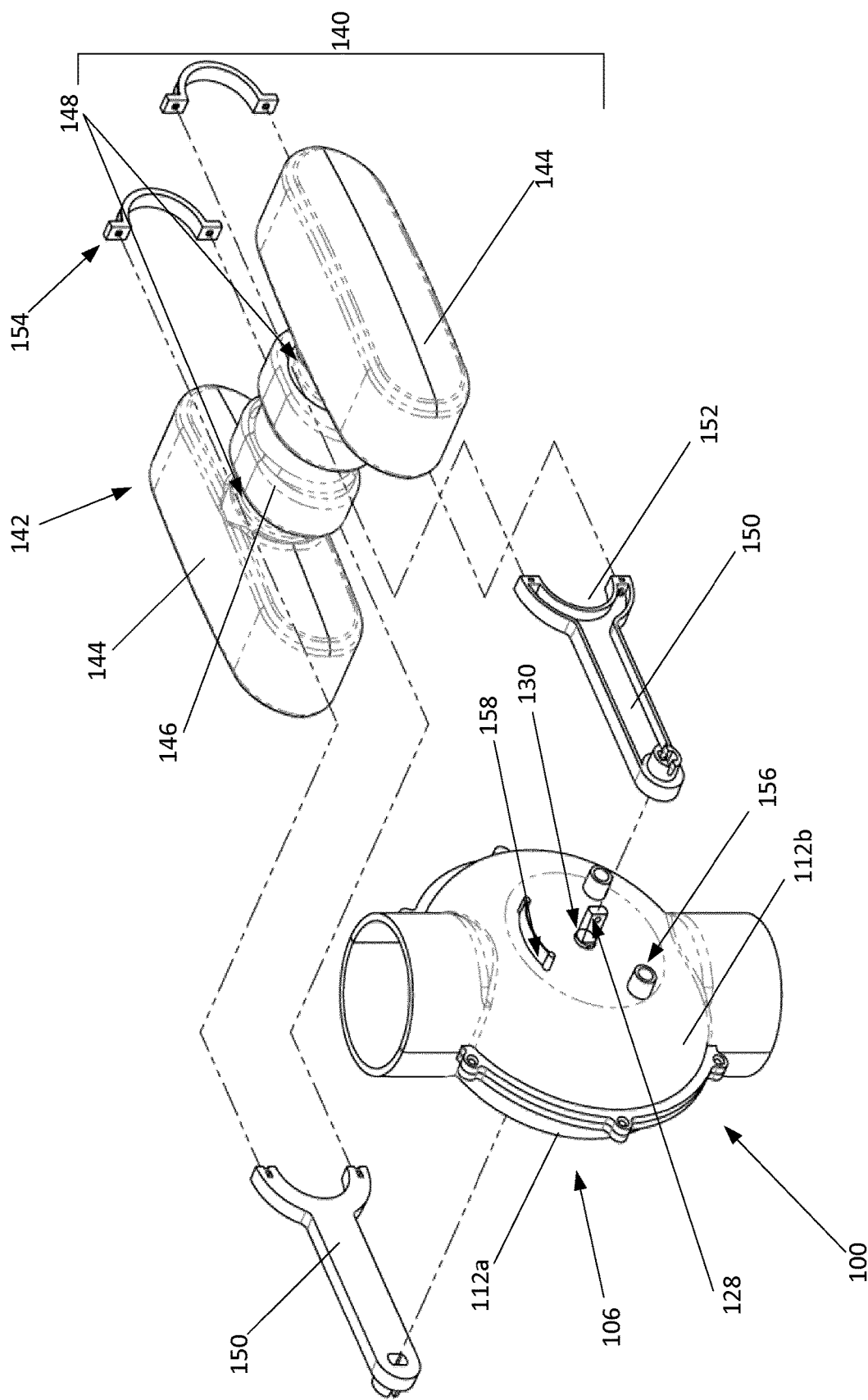
FIG. 2 is perspective view of a rotary valve with partially exploded view of a float assembly.

Turning to FIG. 2, a perspective view of the rotary valve connected to a float assembly (in a partially exploded view) is provided. In use, the float assembly 140 rotates the shaft 128 to cause the rotary valve 100 to move between open and closed positions. In this manner, the rotary valve 100 may open and close the flow of liquid into a tank or other liquid storage containers in which the rotary valve and float assembly is installed. This will be discussed in more detail below with respect to FIGS. 3 and 4.

As can be seen in FIG. 2, when the rotary valve 100 is assembled, the shaft 128 extends or protrudes through the shaft receivers 130 out of the body portion 106. While not shown, opposite ends of shaft 128 are inserted into one end of the shaft receivers 130 that are located on the convex inside surface of each body half portion 112.

The float assembly 140 includes a float 142 having two end portions 144 and a middle portion 146. In the current embodiment, the end portions 144 and middle portion 146 are oblong in shape with the middle portion 146 shorter than the end portions 144. For the current embodiment, the float 142 can be placed in closer proximity to the rotary valve 106 when the rotary valve 100 and float assembly 140 are installed. It will be understood that other design shapes for the floats with differing size ratios may be used. Floats having different shapes, geometry and configurations are also contemplated. The middle portion 146 is connected to each end portion 144 via a set of connection portions 148. In the current embodiment, the connection portions 148 form the narrowest portions of the float 142 and are sized and shaped to receive a float arm 150. In other words, the connection portions 148 are shaped to be complementary to the float arm 150.

Each float arm 150 has a profile at one end (seen as an end portion 152) which receives the associated connection portion 148 so that when a bracket 154 (which is also shaped to match a profile of the connection portion 148) is attached to the float arm 150, it closes around the connection portion 148 to provide a rotatable, or pivotable, connection between the float arm 150 and the float 142. In the current embodiment, the end portions 152 are circular and the connection portions 148 are round.

The other end of the float arm 150 is fixably attached directly to the portion of the shaft 128 which is protruding from the valve body 106, such that when the float 142 is raised or lowered by a liquid level, the float arms 150 will also move up and down (or pivot) causing the shaft 128 to rotate thereby actuating the rotary valve 100 between open and closed positions. The rotation of the shaft 128 moves the plug valve with respect to the divider. In the current embodiment, when the shaft rotates, the plug valve experiences a rocking motion between the open and closed positions. In another embodiment, the connection between the float arms 150 and the shaft 128 is fixed so that the arm 150 is unable to rotate relative to the shaft 128. The connection between the float arm 150 and the connection portion 148 may be fixed or may be such that the connection portion 148 allows for rotation of the float 142 relative to the connection arm 152.

In this embodiment, the rotary valve 100 may further include float rests 156 that are mounted to a side of the valve body 106 such that when the liquid level of the tank drops below a predetermined level, each float arm 150 will rest on the float rests 156 to provide support for the weight of the float 142 or the float assembly 140. The rotary valve 100 may further include a stop 158 to reduce the pressure on the valve 100 when the valve 100 is in the closed position.

Figure 3:
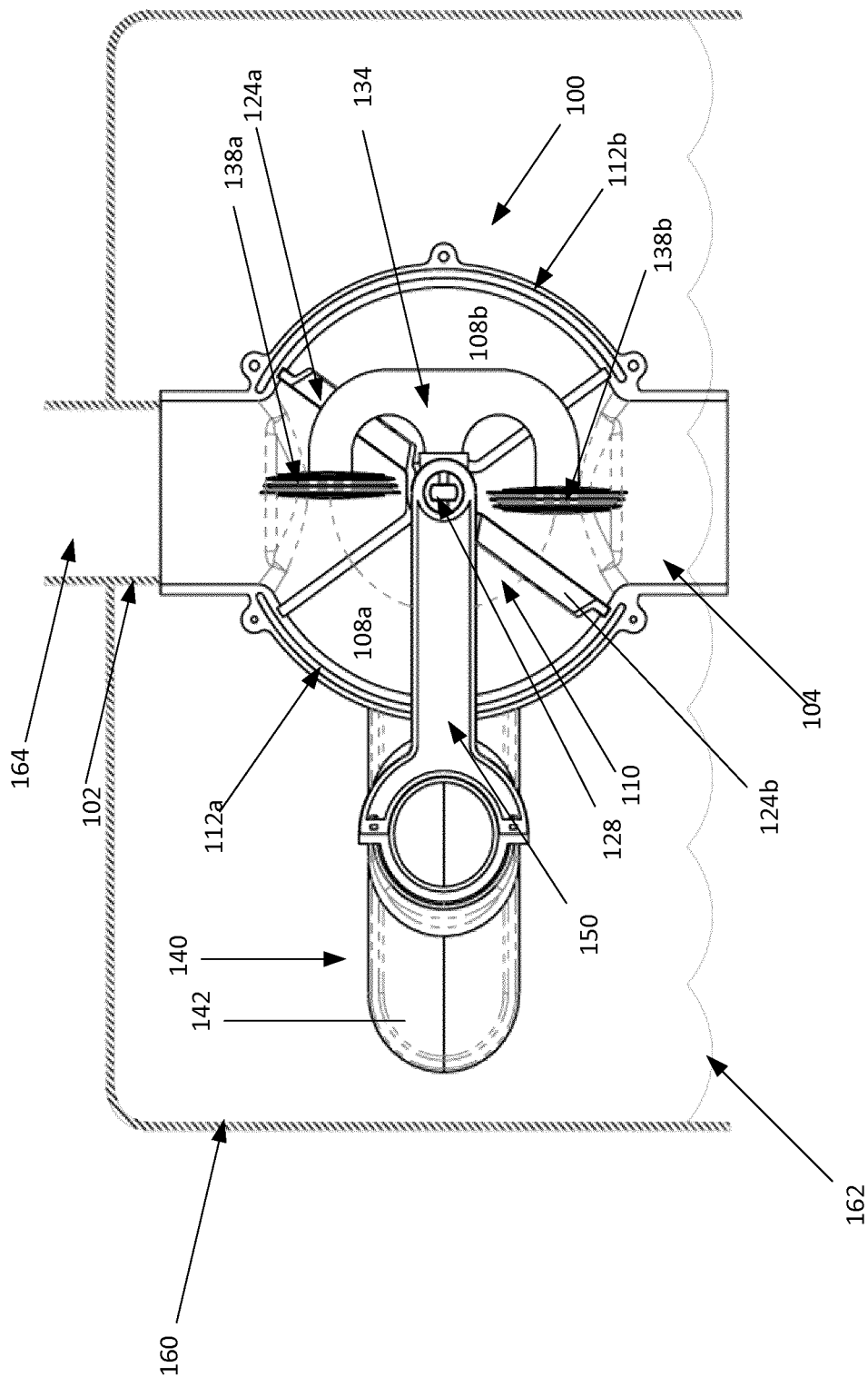
FIG. 3 is a side view of a rotary valve in an open position inside a tank.
Figure 4:
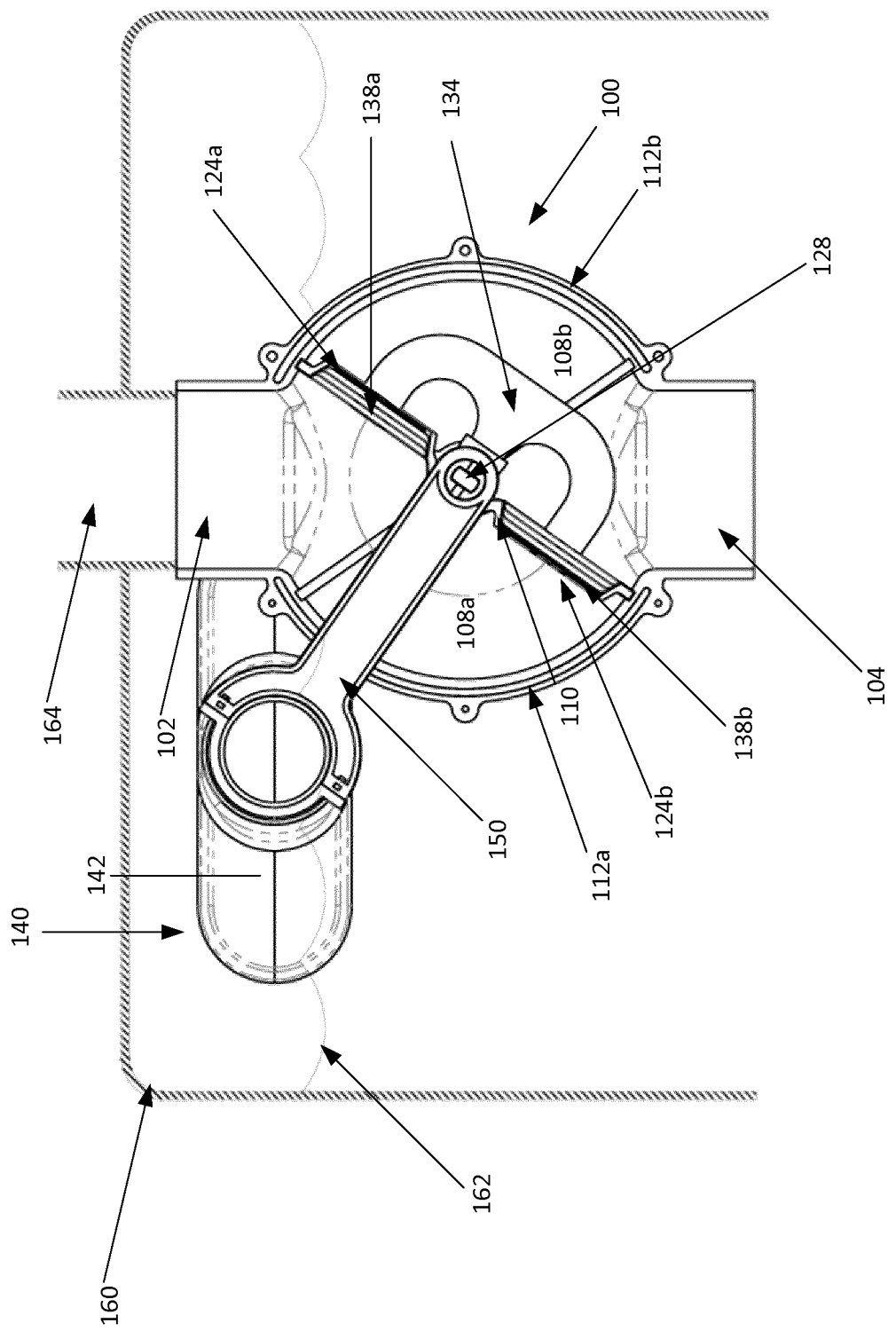
FIG. 4 is a side view of a rotary valve in a closed position inside a tank.

Turning to FIGS. 3 and 4, operation of a rotary valve and float assembly will now be described. FIG. 3 shows the rotary valve 100 located in a tank 160 or other reservoir/receiver/storage device for liquids where the rotary valve 100 may be seen as being in an open flow condition, or open position. When the float 142 is in the neutral (open) position, the shaft 128 is, positioned, or rotated, such that the plugs 138a and 138b of the plug valve 134, or rocker arm, are disengaged from the divider openings 124a and 124b respectively. As can be seen the plugs 138 are on opposite sides of the divider 110.

As discussed above, the float 142 is attached to the rotary valve 100 via the pair of float arms 150 (although only one is shown in the current view) and is located in a position above a liquid level 162. In use, liquid flows into the rotary valve 100 from a source (not shown) through an open inlet pipe 164 that is connected to the inlet portion 102 of the rotary valve 100. One example for a liquid may be rainwater collected by a building stormwater drainage system (the source).

As discussed above, the inside cavity 108 of the rotary valve 100 is split into two sections by divider 110 where the sections may be seen as an inlet cavity side 108a and an outlet cavity side 108b.

In the open position, plugs 138 are disengaged from divider openings 124, and liquid flows from the inlet cavity side 108a through divider openings 124a and 124b to the outlet cavity side 108b. Once in the outlet cavity side 108b, the liquid is free to flow out of the rotary valve 100 through outlet portion 104 and downstream into the tank 160. When the float 142 is in the neutral (or open) position, the weight of the float 142 pulls the float arms 150 down to rotate the shaft 128, such as in a counter clockwise direction (as depicted in FIG. 3), until an upper outside surface of the shaft engagement portion of the plug valve 134 makes contact with the shaft accommodating portion of divider 110. In one embodiment, the shaft accommodating portion is shaped to allow the shaft to rotate over a certain, or predetermined, distance and also provides a stop to the rotation when required.

FIG. 4 shows the same rotary valve 100 in a closed flow position, or closed position. As the liquid level 162 rises in the tank 160, the float 142 is lifted by the liquid, which, in turn, causes the float arms 150 to move upward thereby rotating the shaft 128, either in a clockwise or counter-clockwise direction depending on the point of view and the design of the rotary valve 100. The rotation of the shaft 128 rotates the plug valve 134 (or causes the plug valve to rock from the open position towards the closed position) where the plugs 138a and 138b engage with divider openings 124a and 124b. The plugs 138 engage the divider openings 124 from opposite sides of the divider 110.

Rotation, or rocking, of the plug valve causes the plugs 138a and 138b to seal the divider openings 124a and 124b which prevents, stops, or reduces liquid from flowing from the cavity inlet side 108a into the cavity outlet side 108b. In one embodiment, once the divider 110 is sealed (via the insertion of the plugs 138 into the divider openings 124), liquid can no longer pass through the valve 100 into the tank 160. In one embodiment, the rotary valve 100 may be installed in a location such that when the float 142 is raised by the liquid to a predetermined, or maximum, desired level, the float arms 150 are in the position which causes the plugs 138 to seal the divider openings 124 thus closing the rotary valve 100.

In the disclosure, the plug valve 134 has two plugs 138a and 138b which are balanced relative to a central pivot point whereby the forces acting on one plug 138a or 138b with respect to its divider opening 124a or 124b is equal to the opposition forces acting on the other plug 138b or 138a with respect to its opening 124b and 124a. An advantage of the valve of the disclosure is that it is a well-balanced valve that is easy to seal and can actuate between the open and closed positions with a short stroke. This is beneficial for a reliable automatic liquid level float actuated valve. In general, the larger the forces required to actuate and seal the rotary valve, the larger the float would have to be to generate the force needed whereby the float could become too large to be used for this application.

In one embodiment, the float arms 150 may be adjustable in length to adjust the stroke required to open and close the rotary valve 100, as well as to provide a way to change the torque forces which act on shaft 128 to rotate or rock the plug valve 134, thereby providing a way to increase or decrease the sealing force applied to the plugs 138 when they are engaged with the divider openings 124.

Figure 5:
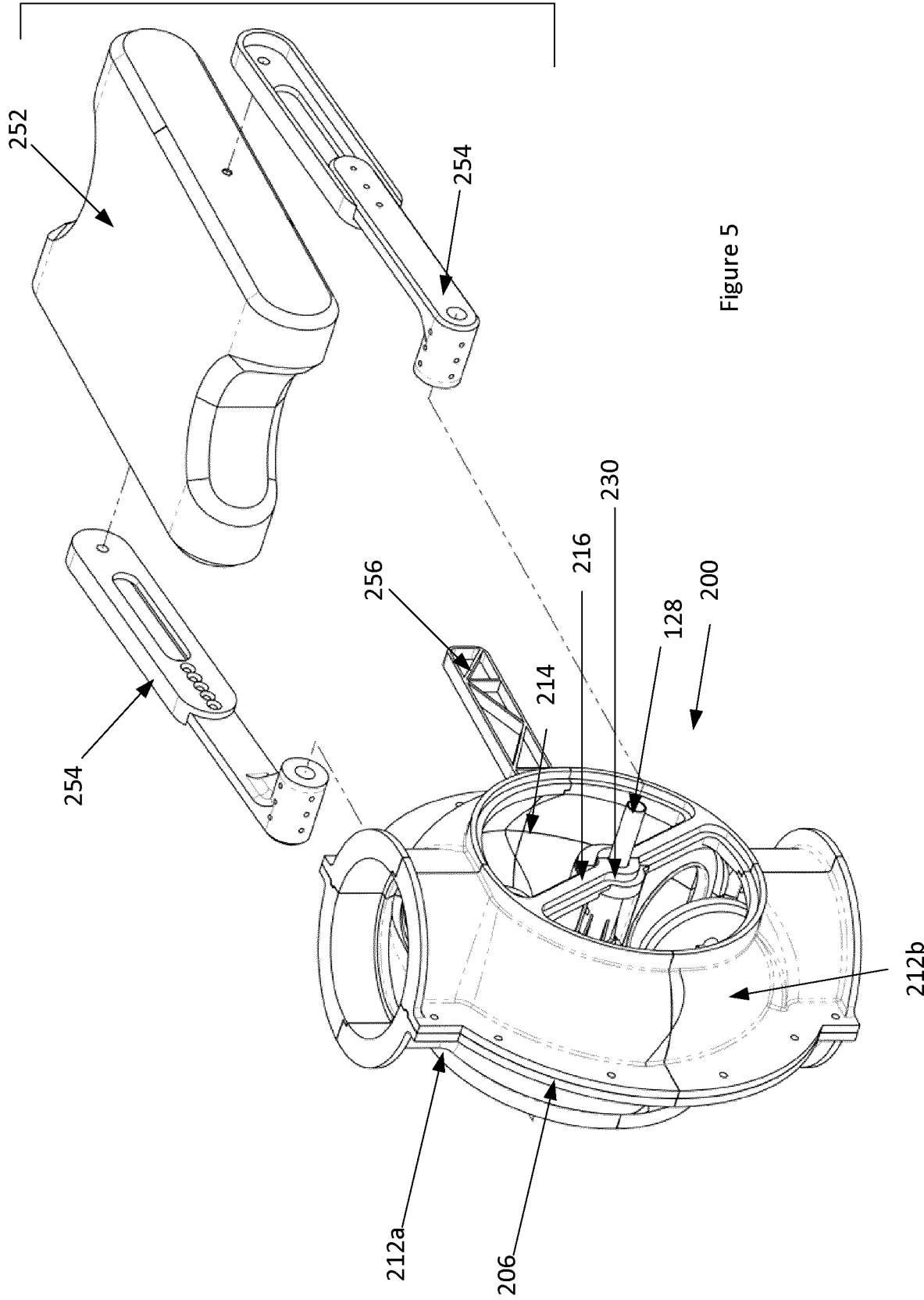
FIG. 5 is a perspective view of another embodiment of a rotary valve with a partially exploded view of another embodiment of a float assembly.

Turning to FIG. 5, another embodiment of a rotary valve and float assembly is shown. As can be seen in FIG. 5, the rotary valve 200 is slightly different than the rotary valve 100. While many components are the same, in the current embodiment, each of the body halves 212a and 212b includes an opening 214 with a cross-bar 216 extending across a diameter of the opening 214. Shaft receivers 230 are located on the cross-bar 216 of each body half portion 212 for receiving the shaft 128 when the rotary valve 200 is fully assembled. As with the previous embodiment, an end of the shaft 128 protrudes out of body portion 206. As schematically shown in FIG. 5, the shaft receivers 230 are located in a centre of the cross-bar 216, or a centre of the opening 214. In an embodiment, shaft receivers 230 may be holes which extend through an entire thickness of the cross-bar 216 and are centrally located within the cross-bar 216 and centrally located relative to the concave outside surface of each body half portion 212.

In order to prevent, or reduce the likelihood of liquid escaping the rotary valve 100, the openings 214 are covered with a material to enclose the opening. While not necessary, in one embodiment, the material is transparent, such as plastic or glass so that a user may be able to see inside the rotary valve 200. However, as with the embodiment of FIG. 1, the body halves may be made of single material.

The float assembly 250 includes a float, or float portion, 252 and a set of, preferably two, float arms 254. In the current embodiment, a length of each float arm 254 can be adjusted so that the float assembly can be adapted for different sized and shaped liquid containers.

One end of each float arm 254 is attached to a side of the float 252 and the other end of each float arm 254 is attached to the end of the shaft 128 protruding outside of each body half portion 212. The float arm connection to the shaft 128 is fixed so that the float arm 254 is unable to rotate relative to the shaft 128 however, the float arm connection to the float 252 is such that the float 252 is able to pivot relative to the float arm 254. As with other embodiments, the connection between the float arm 254 and the shaft 128 is such that movement of the float 252 (due to the changing liquid level) causes the float arms 254 to move resulting in the float arms 254 rotating the shaft 128 thereby moving, or rocking, the plug valve with respect to the divider. In the current embodiment, when the shaft rotates, the plug valve experiences a rocking motion between the open and closed positions.

In use, a bottom surface of the float 252 remains in full contact with a top surface of the liquid level in the tank as the level changes. An optional float rest 256 may be attached to the body portion 206 to support the float 252 in certain situations. Although the float 252 is shown as being generally rectangular in nature, it may be of another shape which provides the necessary force to actuate the valve 200.

While specific rotary valves have been shown with specific float assemblies, it will be understood that they are interchangeable whereby the rotary valve of FIG. 5 may be used with the float assembly of FIG. 2 and the rotary valve or FIG. 2 may be used with the float assembly of FIG. 5.

Figure 6A:
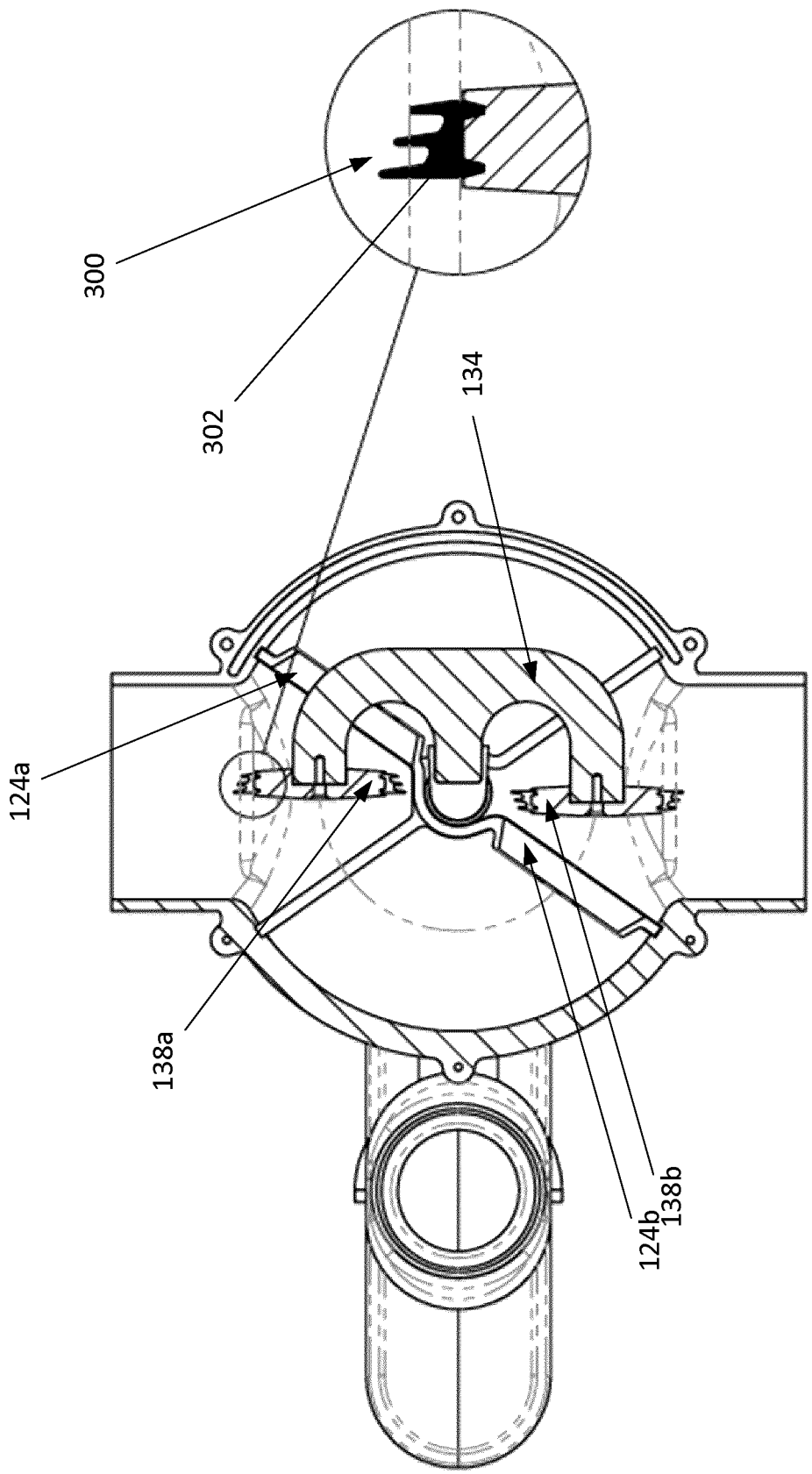
FIG. 6a is a side view of a rotary valve with an enlarged view of a sealing portion in an open position.
Figure 6B:
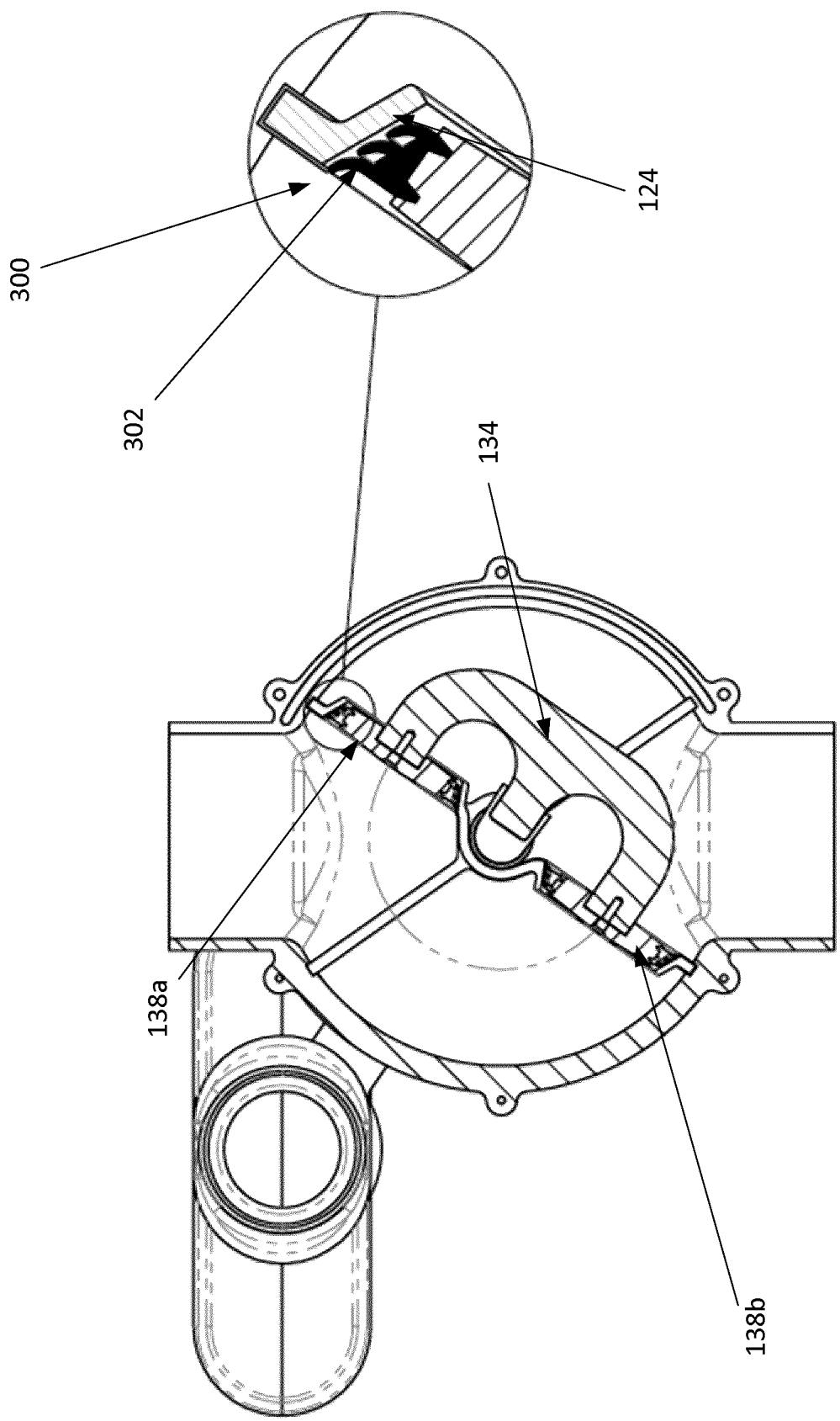
FIG. 6b is a side view of the rotary valve of FIG. 6a with an enlarged view of the sealing portion in a closed position.

Turning to FIG. 6a, a side view of another embodiment of a rotary valve is shown. In FIG. 6a, the rotary valve is shown in the open position. In the current embodiment, the plugs 138 of the plug arm 134 include a sealing portion 300. The sealing portion 300 is preferably made of a waterproof and flexible material, such as, but not limited to, silicon, and may respond to pressure applied to the sealing portion 300. The sealing portion 300 includes a plurality of fingers 302 (in the current embodiment three), that flex or bend (as will be discussed with respect to FIG. 6b). It will be understood that there may be any number of fingers. As shown in FIG. 6b, when the rotary valve is in the closed position, the set of fingers 302 bend when the set of fingers 302 come into contact with the walls of the divider openings 124. The bending of the fingers creates a seal between the plug 138 and the divider opening 124.

Figure 7A:
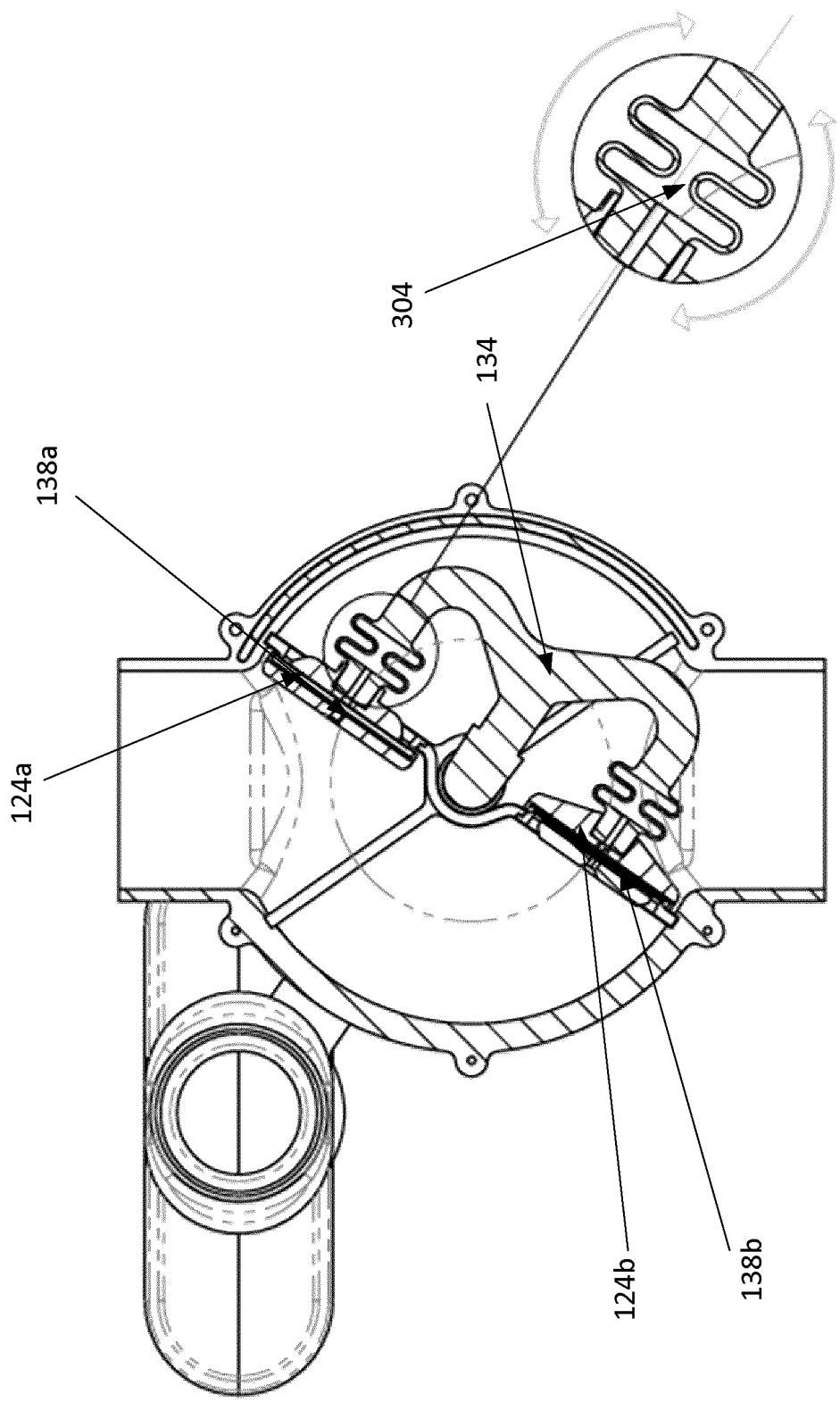
FIG. 7a is a side view of another embodiment of a rotary valve.
Figure 7B:
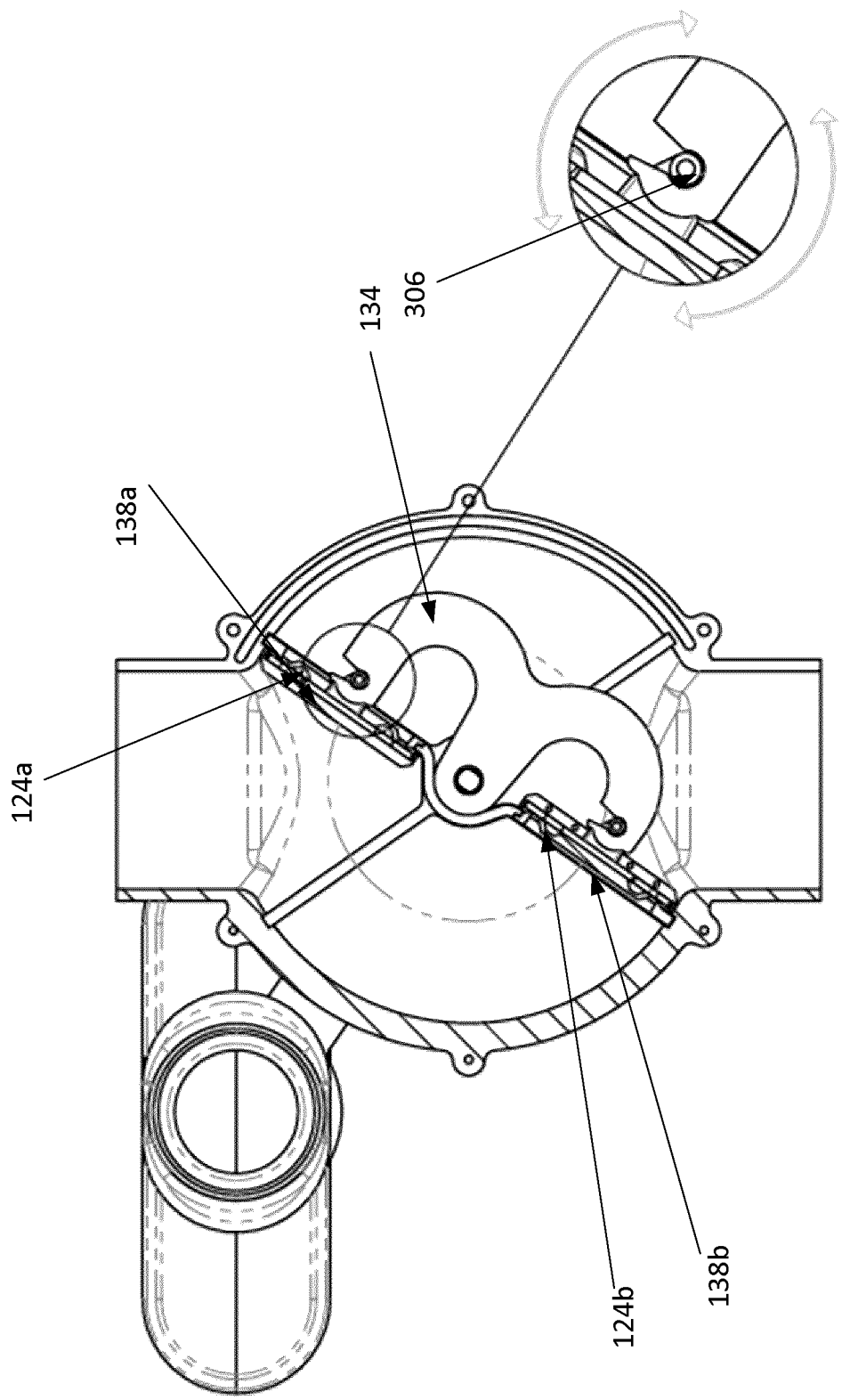
FIG. 7b is a side view of yet another embodiment of a rotary valve.

Turning to FIG. 7a, another embodiment of a rotary valve is shown. In the current embodiment, the plug valve 134 includes a spring portion 304 that may compensate for any manufacturing inconsistency that may affect the contact between the plugs 138 and the openings 124. Turning to FIG. 7b, a further embodiment of a rotary valve is shown. In this embodiment, the plug valve 134 includes a set of pins 306 that holds plugs 138a and 138b to plug valve 134. The pins 306 may also assist in compensating with manufacturing inconsistencies when the plugs 138 are in contact with the divider openings or may assist with alignment of the plugs 138 with respect to the openings 124. The plugs 138 may also be designed to compensate for manufacturing defects or tolerances to improve the sealing between the plugs and the openings.

Figure 8B:
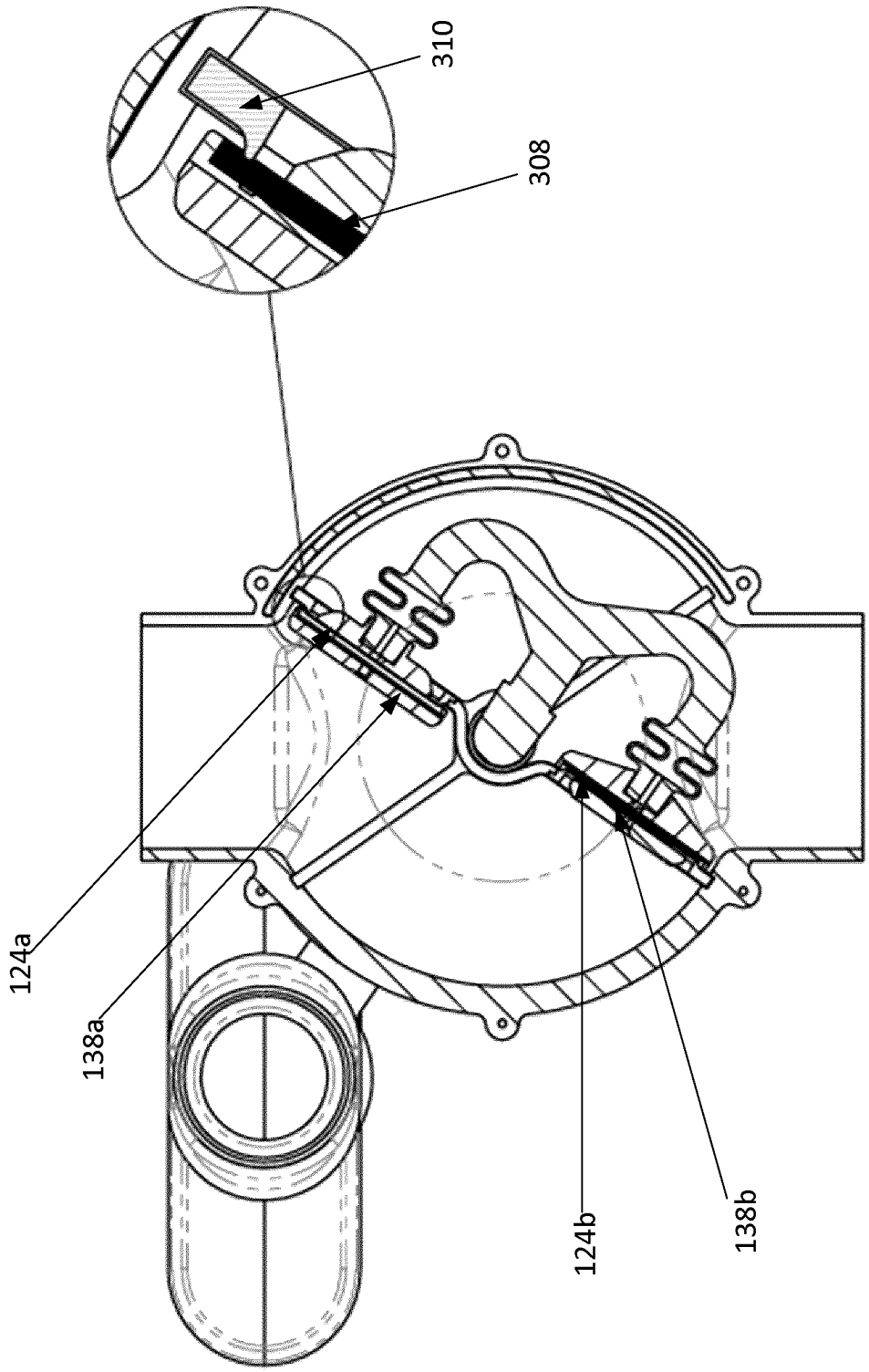
FIG. 8b is a side view of the embodiment of FIG. 8a with an enlarged view of the sealing portion in a closed position.

Turning to FIGS. 8a and 8b, side views of a further embodiment of a rotary valve in an open position (FIG. 8a) and a closed position (FIG. 8b) are provided. As seen in FIG. 8a, the plug 138 may include a sealing portion 308 that is preferably made of a waterproof and flexible material. When in the closed position, the sealing portion 308 comes into contact with a non-flexible sealing portion 310 that is part of the divider opening 124 or part of the divider opening wall. The pressure generated by the float arms (as described above) generates a seal between the sealing portion 308 and the non-flexible sealing portion 310 as the sealing portion 308 deforms to form around the non-flexible sealing portion 310. In the current embodiment, the plug valve may include the spring portion that may also provide compensation for manufacturing inconsistencies such that these inconsistencies do not affect the seal between the plug 138 and its associated divider opening 124.

It should be understood that the rotary valve embodiments described herein could also be actuated through some other apparatus, for example a level sensor which would turn on a motor to rotate the shaft, the benefit of a low force balanced valve would still be applicable in that a smaller powered motor could be used.

Figure 9:
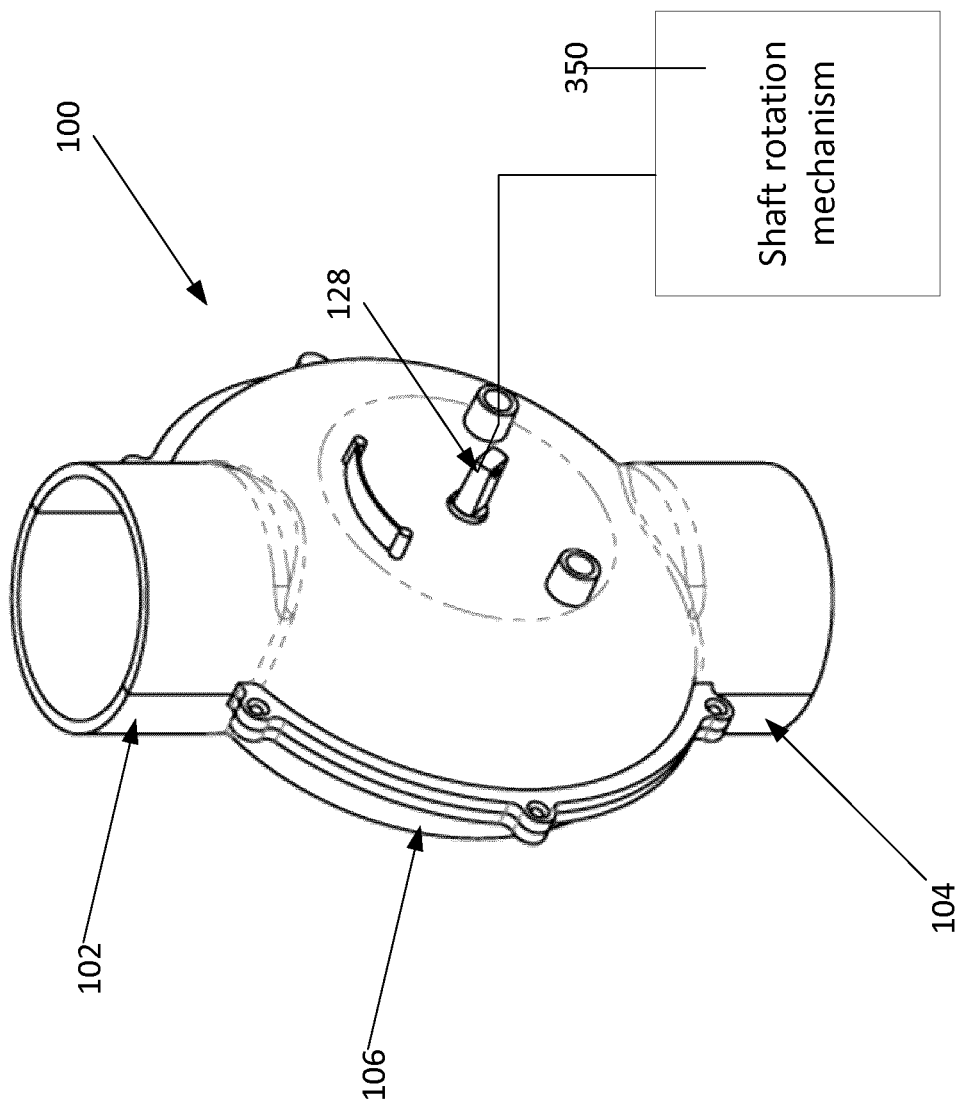
FIG. 9 is a schematic diagram of another embodiment of a system for controlling liquid flow.

Turning to FIG. 9, a schematic diagram of another embodiment of a system for controlling liquid flow is shown. In the current embodiment, the shaft 128 is connected to a shaft rotation mechanism 350 that performs the same or a similar function as the float assembly to rotate the shaft under predetermined conditions causing the plugs to engage with the divider openings to seal the openings. The shaft rotation mechanism 350 may be a motorized or electrically powered actuator. In this embodiment, the system for controlling liquid flow may be installed outside of a tank rather than inside the tank.

Depending on the application of the rotary valve or liquid control system, the rotary valve or liquid control system may be installed either inside or outside a liquid storage container to control the flow of liquid into the liquid storage container. The rotary valve may also be used to control or stop fluid flow for other applications where control of fluid flow is desirable. The disclosure is not necessarily tied with being installed in a liquid storage container such as for the storage or control of liquid into a liquid storage container.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A rotary valve for use in a liquid tank having a level of liquid comprising:
    a body portion including:
        a plug valve portion including a set of plugs;
        a body portion divider including a set of openings for receiving the set of plugs; and
        a shaft portion wherein rotation of the shaft portion controls movement of the plug valve portion with respect to the body portion divider;

float rests mounted to opposite sides of the body portion; and a float assembly portion, the float assembly portion including a float portion and a pair of float arms connected to, and extending from, the float portion at a first end and connected to the shaft portion of the body portion at a second end;

wherein a change in the level of liquid causes movement of the pair of float arms to urge the shaft portion to rotate thereby causing the set of plugs to engage with the set of openings.

2. The rotary valve of claim 1 wherein the pair of float arms are connected to an end of the float assembly portion.

3. The rotary valve of claim 1 wherein the plug valve portion further comprises at least one spring portion.

4. The rotary valve of claim 1 further comprising an inlet receiving a liquid from an external source.

5. The rotary valve of claim 4 further comprising an outlet for releasing liquid from the rotary valve into the liquid tank.

6. The rotary valve of claim 1 wherein the float portion rests atop the level of liquid of the liquid tank.

7. The rotary valve of claim 6 wherein when the level of liquid rises, the float assembly portion rises thereby causing the pair of float arms to move.

8. The rotary valve of claim 1 wherein each of the set of plugs comprises a sealing portion.

9. The rotary valve of claim 8 wherein the sealing portion is made out of a waterproof and flexible material.

10. The rotary valve of claim 1 wherein the float portion comprises:

a pair of float end portions; and a middle float portion;

wherein each of the pair of float end portions are connected to the middle float portion on opposite sides of the middle float portion.

11. The rotary valve of claim 10 wherein each of the pair of float end portions are connected to the middle float portion via connection portions.

12. The rotary valve of claim 11 wherein the pair of float arm are connected to the float portion at the connection portions.

13. The rotary valve of claim 12 further comprising bracket portions for locking the pair of float arm with respect to the float portion.

14. The rotary valve of claim 1 wherein the body portion further comprises a housing component for housing the plug valve portion, the body portion divider and the shaft portion.

15. The rotary valve of claim 14 wherein the housing component comprises a first body cavity wall portion and a second body cavity wall portion that, when connected with each other, form a cavity.

16. The rotary valve of claim 15 wherein the shaft portion extends through openings in the first and second body cavity wall portions.

17. The rotary valve of claim 15 wherein the body portion divider is connected to an inside wall of each of the first and second body cavity wall portions.

18. The rotary valve of claim 17 wherein the body portion divider is connected to the inside wall of each of the first and second body cavity wall portions via slots.

* * * * *